US006183707B1

(12) United States Patent
Gosselin et al.

(10) Patent No.: US 6,183,707 B1
(45) Date of Patent: Feb. 6, 2001

(54) INCINERATION OF WASTE GASES CONTAINING CONTAMINANT AEROSOLS

(75) Inventors: Gérard Gosselin, Charlesbourg; Jean J. O. Gravel, Westmount; Guy Drouin, Montreal, all of (CA)

(73) Assignee: Biothermica International Inc., Montreal (CA)

( * ) Notice: Under 35 U.S.C. 154(b), the term of this patent shall be extended for 1464 days.

(21) Appl. No.: 08/527,591

(22) Filed: Sep. 13, 1995

Related U.S. Application Data

(63) Continuation of application No. 08/323,421, filed on Oct. 14, 1994, now abandoned, which is a continuation of application No. 08/056,897, filed on May 5, 1993, now abandoned, which is a continuation-in-part of application No. 07/894,935, filed on Jun. 8, 1992, now abandoned.

(51) Int. Cl.[7] .................................................... B01D 53/00
(52) U.S. Cl. ......................... 423/210; 423/245.3; 165/5; 588/205; 588/228; 588/230
(58) Field of Search .................... 55/269, 282, 282.2, 55/342.2, 428, 428.1; 110/236, 345; 165/5; 423/210, 245.3, DIG. 18; 588/228, 230, 205

(56) References Cited

U.S. PATENT DOCUMENTS

| 4,277,453 | * | 7/1981 | Aiken et al. | 423/247 |
|---|---|---|---|---|
| 4,398,475 | * | 8/1983 | McKiel, Jr. | 110/346 |
| 4,432,862 | * | 2/1984 | Swart et al. | 208/64 |
| 5,101,741 | * | 4/1992 | Gross et al. | 110/233 |
| 5,129,332 | * | 7/1992 | Greco | 110/233 |
| 5,176,445 | * | 1/1993 | Mize | 366/7 |
| 5,186,901 | * | 2/1993 | Bayer et al. | 422/111 |
| 5,453,259 | * | 9/1995 | D'Souza | 423/245.1 |
| 5,658,541 | * | 8/1997 | Matros et al. | 423/210 |
| 5,888,063 | * | 3/1999 | Scott et al. | 432/181 |

FOREIGN PATENT DOCUMENTS

| 0197023 | * | 10/1986 | (EP) | 165/5 |
|---|---|---|---|---|
| 646191 | * | 2/1979 | (SU) | 165/5 |

* cited by examiner

Primary Examiner—Steven P. Griffin
Assistant Examiner—Timothy C Vanoy
(74) Attorney, Agent, or Firm—Ronald E. Greigg; Edwin E. Greigg

(57) ABSTRACT

A method for treating waste gases contaminated with toxic or odorous compounds in the form of a mist using a regenerative incinerator system is provided. The contaminated waste gas is passed through a first regenerator so that the waste gas is heated by contact with the packing material contained therein. This hot contaminated waste gas is passed through a combustion chamber to oxidize the compounds in the waste gas. The hot treated waste gas is passed through another regenerator to cool the gas and heat the packing material contained therein. The cleaned gas is discharged. Part of the cleaned gas is heated and passed through the regenerator to volatilize and/or remove compounds remaining in the regenerator after passage of the waste gas, thereby cleaning the regenerator.

13 Claims, 5 Drawing Sheets

INCINERATION OF WASTE GASES CONTAINING CONTAMINANT AEROSOLS

CROSS-REFERENCE

This is a continuation of application Ser. No. 08/323,421 filed on Oct. 14, 1994 now abandoned, which is a continuation of Ser. No. 08/056,897 filed on May 5, 1993, now abandoned, which is a continuation-in-part of application Ser. No. 07/894,935 filed on Jun. 8, 1992, now abandoned.

FIELD OF INVENTION

The present invention is directed to the treatment by incineration of air or gases containing toxic or odorous fumes which include a variable amount of a suspension of condensible vapors in the form of a mist of liquid droplets.

More particularly, the invention is directed to a method of treating air or gas containing volatile toxic or odorous compounds in the form of a mist or a suspension of fine liquid droplets arising from the cooling of vapors of high boiling points upon contact with a cooler gas such a ventilation air, which method permits to achieve a high level of destruction of the pollutants with a high heat recovery factor, and a reduced risk of external pollutioninternal fouling of the incineration system and potential fire hazards.

BACKGROUND OF THE INVENTION

In order to protect health and the environment, it is necessary to eliminate undesirable odors and toxic gases from the ventilation air or waste gases occurring as by-products of many manufacturing processes before their discharge to the environment. A known method for removing odors and other organic impurities contained in air or ventilation gases consists in heating the fouled air or gases in a thermal regenerative incinerator system. Such a system which is disclosed by way of example in U.S. Pat. No. 3,870,474, generally comprises at least two and preferably three heat accumulation chambers or regenerators each containing a suitable packing material such as ceramic spheres or nodules, and a combustion chamber positioned to cooperate with both regenerators to effect oxidation of the impurities.

Such an incinerator system has an operating cycle including a plurality of successive steps. In the first step, the waste gases are caused to flow through one of the regenerators in such a manner as to be heated by contact with the packing that has previously been heated, and then to the combustion chamber where total oxidation of the fumes takes place. The hot combustion products are thereafter directed to a second regenerator wherein their heat content is transferred to the packing material. The gases are finally exhausted to the atmosphere. In a second step, the waste gases are directed in the reverse way through the second regenerator, where they are heated. After combustion, they are cooled by passage through the first regenerator and exhausted. Heat losses are made up by injection of auxiliary fuel in the combustion chamber.

In current practice, the incinerator system usually comprises a third regenerator which is added thereto in order to allow for the purging of the waste gases remaining in a regenerator after the waste gas heating period but prior to the introduction of the purified gases.

Regenerative incinerator systems of the above mentioned type are well known apparatuses that have found application for some years for the treatment of waste air or gas streams containing volatile organic compounds in gaseous form, like those produced during the preparation or application of solvent based paints, varnishes or other coatings.

A number of problems arise however when this process is used for the treatment of waste gas or air streams containing condensible organics in the form of aerosols or suspensions of fine liquid particles, like those produced during the impregnation of roofing felts with asphalt base coatings. When treating such waste gases, the condensed vapors or liquid aerosols are carried into the regenerator bed and deposited as a thin liquid film on the inside surfaces of this regenerator and on the packing material in the entrance zone of the regenerator. Upon reversal of the flow, the soiled surfaces are heated by contact with the hot exhaust gases, causing some of the organic liquid film to evaporate and contaminate the otherwise clean gases. This has the effect of materially reducing the destruction efficiency of the process. In addition, any portion of the liquid deposited which is not evaporated remains on the packing and adds up during subsequent cycles, causing a run-off of excess liquid in the gas plenum of the regenerators. This liquid wets the regenerator and packing surfaces and upon evaporation increases the contamination of the exhaust gases. Further, this excess liquid is slowly distilled in contact with the hot gases, leaving behind deposits of tarry substances on the packing and on the walls of the plenum chambers as well as on the valve chambers and moving parts. These deposits can impair the operation of the process and, if allowed to accumulate, can ignite and cause severe overheating and failure of mechanical parts.

OBJECT OF THE INVENTION

The object of the present invention is to provide a method for treating waste gases or air containing odorous or toxic compounds, especially organic compounds, in the form of saturated vapors, mists, aerosols and suspensions of condensible liquid droplets in equilibrium with their vapor phase, which method derives from the one carried out with the known regenerative incinerator system but is improved over the same so as to achieve virtually complete elimination of the above mentioned compounds while simultaneously achieving a high thermal recovery factor and reducing risks of overheating and damaging the equipment.

SUMMARY OF THE INVENTION

In accordance with the present invention, there is provided a method for treating waste gases containing volatile toxic or odorous compounds as a condensed phase in the form of a mist or a suspension of fine liquid droplets, using a regenerative incinerator system of the type comprising at least three regenerators containing a packing material, each of the regenerators having one end always in open communication with a combustion chamber common to all of the regenerators.

The method according to the invention has a cycle of operation comprising:

a) during a first period of time:
  passing the waste gases first through at least one of the regenerators so that the waste gases be pre-heated by contact with the packing material contained therein when this material is hot; then through the combustion chamber to assure complete oxidation of the compounds contained in the waste gases; and finally through at least one other of the regenerators to cool the gases from the combustion chamber by contact with the packing material contained in the at least one other regenerator, such a contact causing the packing material to be heated up, the gases leaving the at least one other regenerator being clean and discharged to the atmosphere; and simultaneously recycling part of the clean gases as a purging gas through at least one of the remaining regenerators for purging the at least one remaining regenerator of any waste gases or of the compounds remaining therein, the purging gas being fed into the at least one remaining regenerator opposite the one end thereof in communication with the combustion chamber so that the purging gas leaving the at least one remaining regenerator be fed into the combustion chamber to remove any contaminant that would be carried by the purging gas before the purging gas is discharged from the system together with the clean gases;

b) during a second period of times:

reversing the direction of flow through the regenerators so that the waste gases to be treated be fed first through the at least one other regenerator which was, in the first period of time, traversed by the flow of gases coming from the combustion chamber; thus through the combustion chamber and finally through the at least one remaining regenerator which was just being purged; and simultaneously recycling part of the clean gases as a purging gas into the at least one regenerator which was previously fed first with the waste gases; and c) during a third period of time:

reversing again the direction of flow of the waste gases, the clean gases and the purging gas through the regenerators in the same manner as above to achieve preheating of the waste gases in the at least one remaining regenerator, heat exchange with the hot packing material in the at least one regenerator now purged, and purge of the other regenerator; and d) repeating the previous steps in the very same order to provide for a continuous flow and treatment of the waste gases through the system, together with a substantial recovery of the heat contained in the waste gases after combustion thereof in the combustion chamber.

In accordance with the invention, the above method which is known per se, is improved in that it further comprises: e) raising the temperature of said part of said clean gases used as a purging gas prior to entry of said purging gas into each regenerator to be purged so as to increase volatilization and removal of the compounds remaining in said regenerator after the passage of said waste gases.

Such a raising of the temperature of the purging gas can be achieved by direct heating with a fuel burner or by indirect heating by heat exchange with another gas stream at a higher temperature, like a stream of gas drawn from the combustion chamber or from any other source.

Preferably, a mist separation device can be installed in the waste gas supply duct to the system so as to capture and remove as much as possible of the liquid mist contained in the waste gases prior to their introduction into the regenerators.

In accordance with a preferred embodiment of the invention, the duration of each period of time in steps a), b) and c) may also adjusted so as to cause an increase in the temperature of the clean gases leaving the system and thus an increase in the temperature of the packing material contained in the regenerators which, in turn, causes an increase in the volatilization of any deposits of liquid accumulated in the regenerators by mere evaporation of the same during normal operation.

In accordance with another preferred embodiment of the invention, the above method may further be improved by purging at regular intervals each regenerator in turn, with purging gas at a raised temperature, for an extended period of time, so as to cause the volatilization and removal of any residues remaining in the regenerator, while the other regenerators continue to operate in a modified cycle to treat an unintempted flow of waste gases.

In accordance with still another preferred embodiment of the invention, the above method may further be improved by providing for an additional regenerator in the system, so that one regenerator, at a time, may be purged for an extended period of time of about 5 to 15 times the duration of the period of the operating cycle, thereby causing a rise in temperature of the packings in the regenerator and a complete volatilization of any residues accumulated during the normal operation, while the other regenerators in the system continue to be operated in the normal cycle to insure a continuous flow and treatment of the waste gases. Each regenerator in the system would subsequently be subjected in turn to such an extended purge, while the others will continue to provide for the treatment of the waste gases.

In accordance with a further preferred embodiment of the invention, the above method may further be improved by discharging gases from the combustion chamber directly to the atmosphere by means of a control valve through a vent stock, whenever required to remove combustion products and other hot gases and prevent damaging the apparatus. This also allows for venting and cooling by natural convection of the combustion chamber and the regenerators whenever the normal flow of waste gases through the system is accidentally interrupted or materially reduced.

In accordance with yet a further preferred embodiment of the invention, the above method may further be improved by periodically purging each regenerator in turn with a heated purging gas, for an extended period sufficient to raise the temperature of the packing, so as to cause volatilization and removal of any residues accumulated during normal operation, while venting said purging gas through the control valve and vent stack as provided for above, while the other regenerators are held inoperative, awaiting a similar periodic purging step.

Thus, the invention provides means to reduce the amount of liquid mist accumulating into the incinerator by raising the temperature in the regenerator so as to favor the evaporation of the liquid condensate upon its admission into the working parts of the system. It also provides means to effect the removal of the liquid condensate on the surfaces of the equipment and the packing by heating the purging gas to a temperature such as to cause volatilization of said remaining condensate. The invention further provides means to clean the bed of any residues remaining therein by periodically conducting a sustained purge at high temperature, sufficient to raise the temperature and volatilize and eliminate all tarry or carbonaceous deposits.

BRIEF DESCRIPTION OF THE DRAWINGS

In the drawing which illustrate preferred embodiments of the invention.

DESCRIPTION OF PREFERRED EMBODIMENTS

Figure 1:
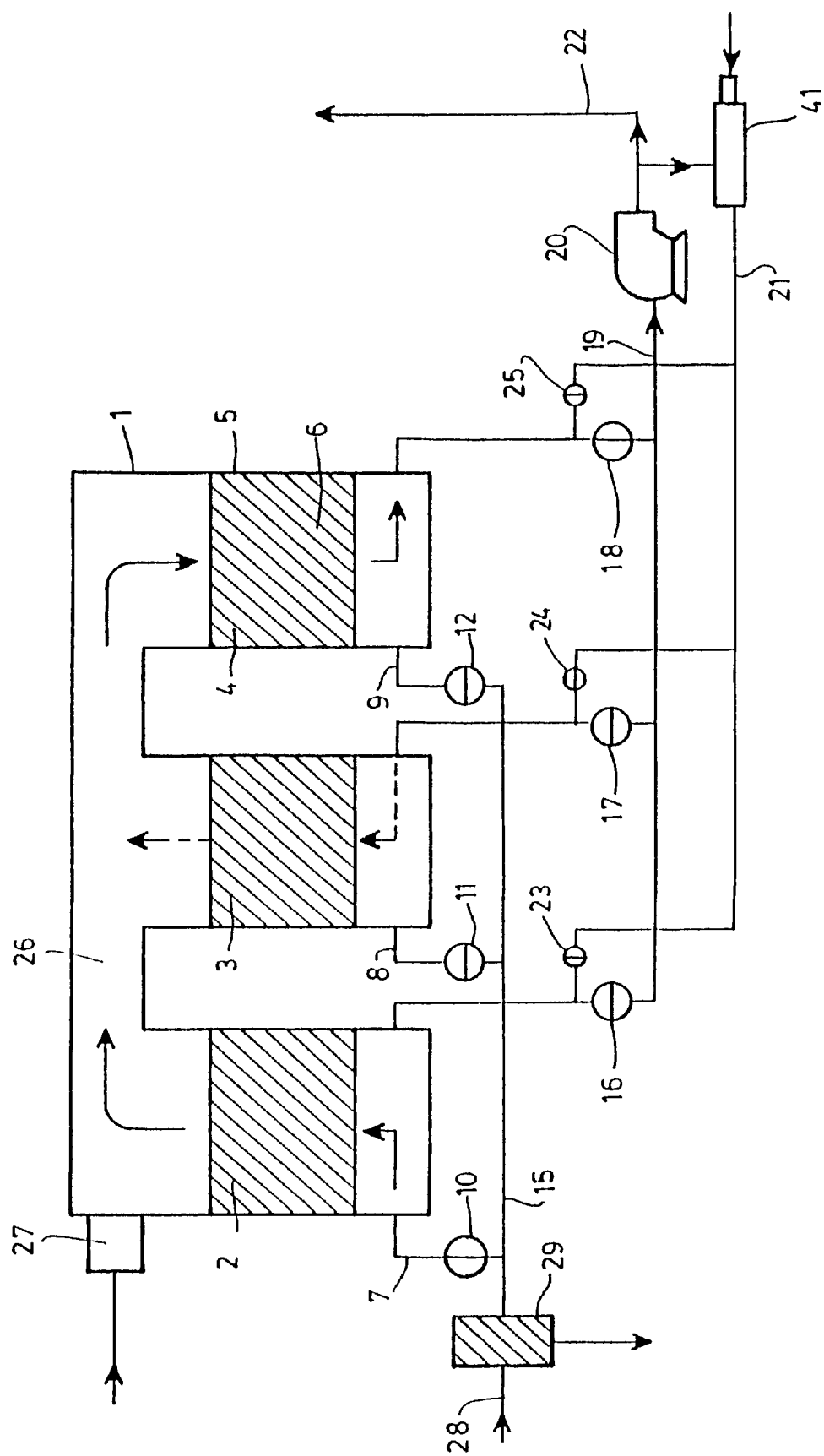
FIG. 1 is a flow diagram of a regenerative incineration system for carrying out the method according to the invention, equipped with a mist separation device inserted in the gas duct leading from the source of waste gases to the incineration apparatus and with a fuel burner mounted in the purging gas supply conduit, this figure also showing the valve positions and flows during the first period of the cycle.

FIGS. 1 to 5 of the drawings are a schematic representation of a regenerative incinerator system operable according to the invention.

Like all the existing systems of the same type as briefly disclosed hereinabove in the "Background of the invention" the regenerative incinerator system 1 according to the invention comprises three regenerators 2, 3 and 4 each comprising a regenerator shell 5 filled with a suitable heat retention packing material 6 such as quartz gravel, metal or formed ceramic pieces.

A set of conduits 7, 8 and 9 each containing a suitable supply valve 10, 11 and 12 are connected to one end of each of the regenerators 2, 3 and 4, respectively, to feed any one of them with contaminated air to be treated, that is supplied through an inlet conduit 15. A similar set of discharge valves 16, 17 and 18 are also connected to the same one end of the regenerators 2, 3 and 4, respectively, to allow the treated or purified air fed into any one of the regenerators to escape through a discharge conduits 19 leading to an exhaust conduit 22. An exhauster blower 20 is connected to the discharge conduit 19 to assist in venting the purified air to the atmosphere and to pressurize said purified air. A purge air conduit 21 is connected to the exhaust conduit 22 downstream of the blower for selectively recycling a small amount of purified air under pressure to any one of the regenerators 2, 3 and 4 upon opening of control valves 23, 24 and 25 positioned to provide communication between the purge air conduit 21 and the regenerators, respectively.

The regenerators 2, 3 and 4 have their other ends in communication with a common combustion chamber 26 in which is located a burner 27. The burner 27 is fed with fuel that is injected into the chamber 26 for combustion with the oxygen of the air coming from the regenerators, in order to incinerate any fume, odor and particulate material contained in the air and to convert essentially all of them to harmless carbon dioxide and water vapor.

The conventional method of operating such a regenerative system consists in reversing the air flow through the regenerators at regular intervals so that the heat extracted by and accumulating in the packing material when the hot gases from the combustion chamber passes through a given regenerator located downstream the combustion chamber when the system works in one way, be recovered and used to preheat the incoming gases passing through the same regenerator when the flow is reversed and said given regenerator is then located upstream, thereby substantially reducing the amount of fuel required to heat the contaminated air to the desired purification temperature.

This conventional method is efficient but has a major drawback when use is made of two regenerators only. Indeed, one can see that when the flow of air is reversed through the regenerators, the contaminated air which has just entered one of the regenerators is, immediatly after flow reversal, expelled into the atmosphere without having passed entirely through the regenerative system. In the case of odor, for example, one volume of untreated air may impart an objectionable odor to many thousands identical volumes of clean air.

To avoid this drawback, it is of common practise to use a regenerative incinerator system having three regenerators, as is shown in FIGS. 1 to 5. With such a system, expulsion of any untreated or partly treated gas flow during reversal of the main gas flow through the system, is prevented by passing the main gas flow through two only of the three regenerators during one period of operation while purging the third regenerator of any contaminated air contained therein, and subsequently using this third regenerator that has just been purged as the next regenerator downstream of the combustion chamber through which purified air is discharged to the atmosphere in the next period.

More particularly, during the first period of operation, as shown in FIG. 1, the supply valves 10, 11 and 12 are so switched that the contaminated air supplied through the inlet conduit 15 enters the first regenerator 2 and moves up through the packing material 6 contained therein. During such a motion, the incoming air is preheated or warmed by the packing material 6 when the same is hot, as it is supposed to be when the system is in already operation. When the air leaves the first regenerator 2, its temperature may be as high as 1650° F.

The heated air leaving the first regenerator 2 then enters the combustion chamber 26 where fuel is injected. This fuel mixes with the air and is subject to combustion with the excess of oxygen contained in it, thereby raising the average temperature of the air as necessary to oxidize substantially all of the odors and contaminants in the air. Since only a small temperature rise is needed, only a small amount of fuel is required to heat the air up to the desired temperature.

The purified heated air from the combustion chamber 26 then passes through the third regenerator 4. As it passes through the packing material contained in this regenerator 4, it transfers its heat to the packing material of this regenerator 4, and this heat is stored until the next period of operation. The purified air leaving the regenerator 4 passes through the valve 18 into the discharge conduit 19 and is vented to the atmosphere except for a small portion of purified air which is used to purge the second regenerator 3 of any contaminated air upon opening the control valve 24. The purified purge air fed to the regenerator 3 forces the contaminated air out of this regenerator into the combustion chamber 26 where it is mixed with the fuel injected by the burner and heated to the purification temperature for oxidation of the contaminants, as was previously described.

Figure 2:
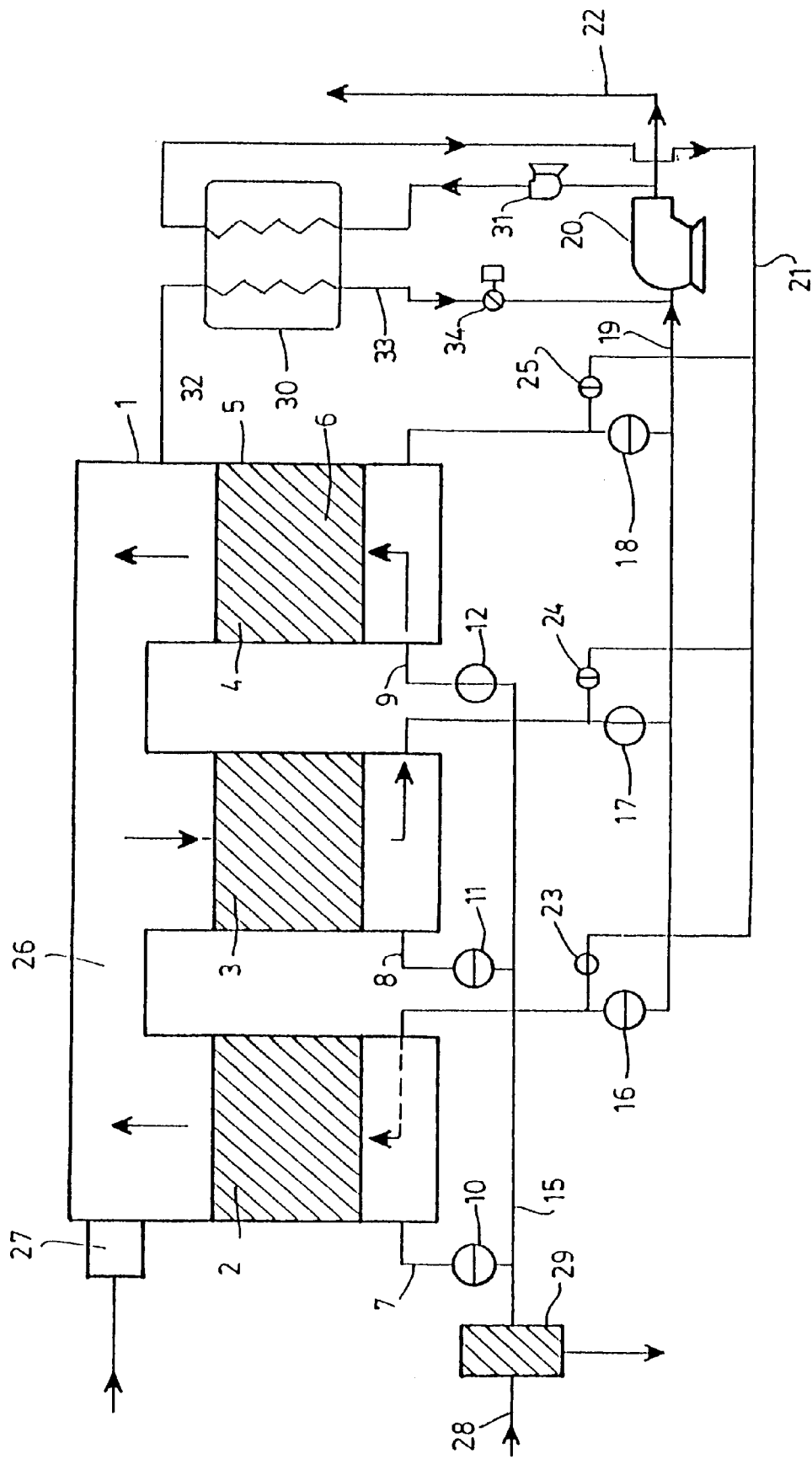
FIG. 2 is a flow diagram of a regenerative incineration system similar to the one of FIG. 1, but equipped to heat the purging gas drawn from the discharge stack and by indirect heat transfer with a side stream of hot gases drawn from the combustion chamber, this figure also showing the valve positions and flows during the second period of the cycle.

Upon completion of this first period of operation, as determined by a timer or by temperature measurement, the various valves are automatically switched as shown in FIG. 2 so that the contaminated incoming air enters first the third regenerator 4 and makes use of the heat accumulated in the packing material contained therein to achieve the required preheating. All the purified air leaving the combustion chamber 26 is then directed toward the now purged second regenerator 3. The supply valve 10 of the first regenerator 2 is switched to block communication with the inlet conduit 15, and the discharge valve 16 of this regenerator 2 is switched to stop the flow of gases to the discharge conduit 19 while the control valve 23 is opened for passage of a small amount of purified air through the first regenerator 2 to purge it with purified air for making it useful for the next period of operation.

Figure 3:
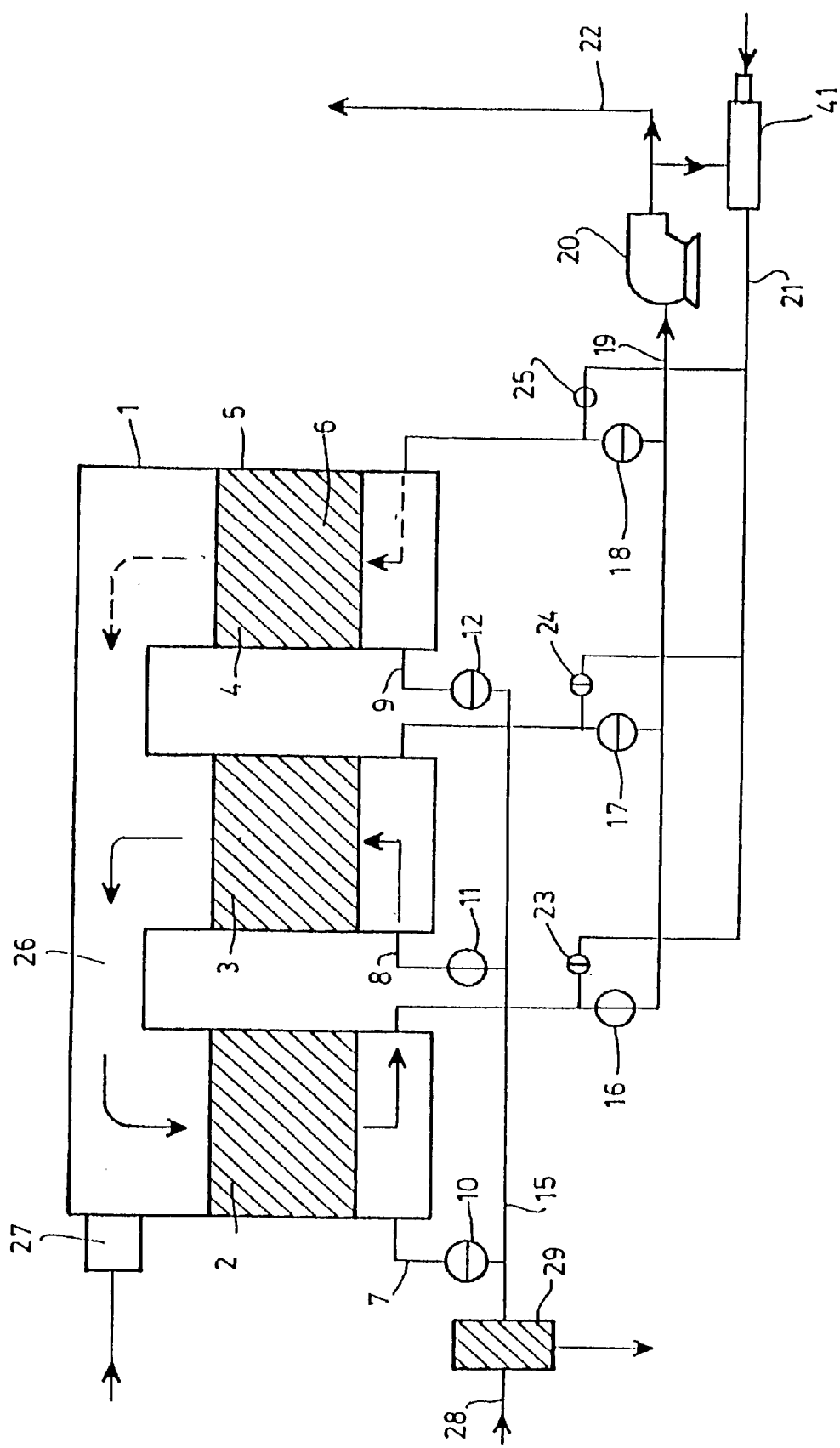
FIG. 3 is a flow diagram of a regenerative incineration system as shown in FIG. 1, illustrating the valve positions and flows during the third period of the cycle of operation.

When the second period of operation is completed, the valves are again switched as shown in FIG. 3 so that all of the incoming air enters the second regenerator 3 first and all the purified air leaves through the now purged first regenerator 2, while the third regenerator 4 is being purged by opening the control valve 25 in communication with purge air conduit 21.

The basic structure and the operation of the regenerative incineration system 1 as described hereinabove, are both well known in the art and commonly used for the destruction of volatile odorous or toxic organic fumes present in varying concentration in ventilation air or other gaseous stream exhausted by industrial processes.

Such a known system may generally be considered as efficient when the gaseous stream to be treated is "dry". However, when the waste gaseous streams to be heated contain a suspension of fine organic droplets, such as a mist produced by condensation of hot vapors upon contact with cooler ventilation air or gases the above system has been found to be substantially less efficient, the liquid material in suspension impairing proper operation of the system as was outlined above in the Background of the invention.

In order to present contamination of the purified air or gas stream flowing out of the combustion chamber during its passage through the downstream heat recovery regenerator prior to its discharge into the atmosphere, it is necessary, as was already explained hereinabove, to clear the external surface of the packing material as well as the inside surfaces of the regenerator that is not in use, and of its associated gas plenum and ducts, of any volatile organic material, that has accumulated during the passage of the untreated waste gas in the preceding step. This can be normally achieved by purging the said regenerator with a small amount of purified gas drawn from the exhaust stream of the system, for a selected period of time.

Where the volatile organic compounds to be eliminated in the air to be treated are present only in a gaseous state, an adequate purging can normally be obtained by recycling a small amount of no more than 10% of the total waste gas flow, for a period of time of about that of a normal period of each passage of gases in the system. However, if the waste gases fed to the incinerator system contain some volatile organic compounds as a suspension of condensed droplets, a substantial portion of this liquid material is deposited on the inside surfaces of the inlet plenum chamber and on the surface of the packing material in the entrance region of the regenerator receiving the waste gases input.

Removal of these deposits by means of a purge may only be achieved by evaporation in the purging gas. However, some compounds present in the liquid mixture may have high boiling temperatures and therefore low vapor pressures at the temperature of purging. Complete removal of these compounds can therefore be achieved only by increasing the rate of flow of the purging gas, the temperature of this purging gas and/or the duration of the purge.

A first object of the present invention is to provide a method for removing as much liquid deposit as possible during the purge of each regenerator. In accordance with this invention, this is achieved by supplying the purging gas into the regenerator to be purged at a higher temperature than that of the exhaust gases as is presently used.

A preferred method of achieving such a heating is shown in FIG. 1. According to this method, a stream of purified gas is drawn from the exhaust conduit 22 and is passed through a fuel burner 41 where its temperature is raised sufficiently to cause the evaporation of the liquid deposits in the regenerator, when this heated gas is used to purge the same.

Another preferred method of achieving such a heating is shown in FIG. 2. According to this method, a stream of purified gas is drawn from the exhaust conduit 22 and is passed through a heat exchanger 30 where its temperature is raised to a temperature sufficient to cause complete evaporation of the liquid deposits in the regenerator when this heated gas is used to purge the same. In order to sustain the necessary flow of purging gas, it may be necessary to incorporate in the conduit an auxiliary blower 31. The heat required for heat transfer in the exchanger 30 is obtained by derivation via a conduit 32, of a part of the high temperature combustion gases in the combustion chamber 26. After passage through the heat exchanger 30, the combustion gases at a reduced temperature are removed by way of a conduit 33 and discharged into the discharge conduit 19 where they are evacuated with the purified gases. Control of the temperature of the heated purging gas stream may conveniently be achieved by means of a control valve 34 which regulates the flow of heating gas drawn from the combustion chamber 26.

As aforesaid, another way for achieving complete removal of the compounds accumulated in the regenerators is to increase the duration of each period of time of the cycle of operation so as to cause an increase in the temperature of the clean gases leaving the system and thus an increase in the temperature of the packing material contained in the regenerators which, in turn, causes an increase in the rate of volatilization and combustion of residues accumulated in the regenerators by mere evaporation of the same during normal operation.

Yet another way of achieving such a complete removal is to increase the period of time during which the purge gas is fed into each of the regenerators to purge the same. Usually, such a period of time is approximatively equal to each period of time of the cycle of operation.

In accordance with the invention, such a period of purge may considerably be increased so as to achieve substantially complete elimination of the compounds accumulated in said regenerators during passage therein of said waste gases. This can be done by providing one or more additional regenerators so that one of them may be purged for an extended period of time while the others continue to treat the waste gases in the manner described above. Alternatively, one regenerator can be purge for an extended period of time while the others continue to operate in a cycle modified so as to provide for the continuous flow and treatment of the waste gases.

A second object of the invention is to provide a method for periodically removing from all the inside surfaces of a regenerative incinerator system used for the treatment of waste gases containing condensed organic vapors in the form a liquid suspension or of a mist, all tarry or carbonaceous residues deposited thereon by mere distillation of these residues during normal operation. Although these deposits may amount to a very small portion of the organic fumes treated during each cycle, the accumulation in the conduits and regenerator packing material may after a while cause blockages, reduce the heat transfer, be ignited and damage the equipment through overheating. It is therefore required to periodically remove these deposits from the system equipment in a controlled manner without risk of damaging the system or discharging noxious fumes in the atmosphere.

In accordance with the invention, such a periodic removal of the deposits accumulated in the system may be achieved by carrying out a sequence of steps at regular intervals during operation of a system, in order to raise the surface temperature of all the portions of the system to be cleaned in the presence of hot purging air, so as to cause volatilization of the deposited residues and their total oxidation in the combustion chamber prior to their discharge to the atmosphere.

Figure 4:
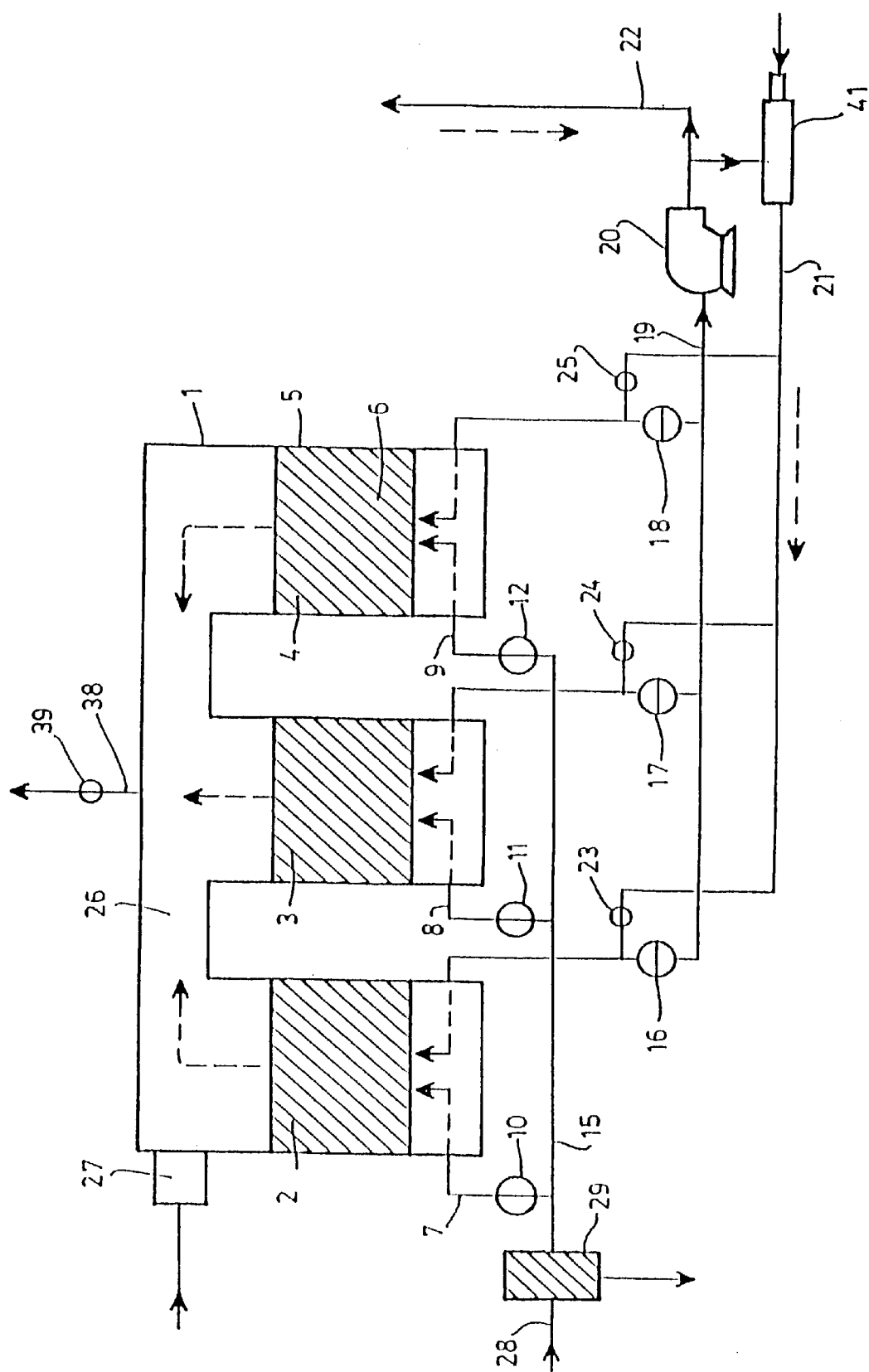
FIG. 4 is a flow diagram of a regenerative incineration system as shown in FIG. 1 but equipped with a vent stack, illustrating the valve positions and flows obtained after an interruption of normal flow due to failure of power to the blower or other cause, such a flow pattern being also useful to insure safe cooling of the system after normal shut down of its operation.

To carry out such a sequence of steps, the regenerative incinerator system as described above must be equipped with a vent stack 38 and a discharge valve 39 connecting the upper part of the combustion chamber 26 to the atmosphere as is shown in FIG. 4.

In the first step of the above sequence of steps, the gas discharge temperature of the gas passing through the system is caused to increase above the normal operating level so as to raise the temperature of the packing material in the regenerators and discharge conduits to favor the volatilization. A discharge temperature of up to about 600° F. may be required depending on the nature and age of the deposits. Such an increase in the discharge temperature can readily be obtained by increasing the duration of each period of the conventional cycle of operation of the system by suitably adjusting the control system. Alternatively, the sequence of operation of the control valves may be governed by a temperature detector located in the discharge conduit, and by a preprogrammed control device.

In the second step of this sequence, the input of waste gases into the system is interrupted. The control valves are set as shown in FIG. 4, the burner 27 and the exhauster blower 20 are stopped and the hot gases from the combustion chamber are discharged through the vent stack 38 equipped with the discharge valve 39 that is then open. A continuous flow of fresh air is drawn simultaneously into each of the three regenerators by natural convection through the waste gas conduits 15 and the inlet valves 10, 11, 12 that are also switched in open position. A small additional air flow is admitted through the purging valves 23, 24 and 25 that are also open, and through the purge gas conduit 21, via the exhaust conduit 22. The air flow passing through the system is obtained by natural convection due to the high temperature of the packing material bed, and ponderated by the various restrictions to flow caused by the conduits, valves, regulators and vent stack 38. This flow should normally amount to about 5% to 20% of the normal flow in the system, and serves as the source of combustion air for a slow oxidation of the residues.

The fumes that are produced are conveyed to the top part of each regenerator bed, where they are heated by heat exchange with the packing material and fully oxidized in the combustion chamber prior to their discharge to the atmosphere.

This process is continued until the temperature in the combustion chamber drops by about 100–300° F. below normal. This indicates that removal of the deposits is substantially complete.

It is worth mentioning that the addition of a vent stack 38 to the combustion chamber of the above system is also very interesting from a safety stand point, as such a stack 38 may efficiently protect the system from overheating in the case of an interruption of operation of the main blower or any of the control equipment. Indeed, in such a case, opening of the discharge valve 39 of the vent stack in the roof of the combustion chamber 26 together with an opening of the three purging valves, will allow venting, by natural convection, of any excess amounts of hot or combustible gases which would otherwise accumulate in the regenerators and combustion chamber with a corresponding risk of fire and substantial damage to the same.

If the cleaning sequence is carried out at the termination of a production run in a plant, the regenerative system can be cooled and banked by continuing the second step of this sequence of steps until the outlet temperature drops to the required level. If however, production is to be resumed, the incineration system can be re-started in a short period of time by the usual start-up procedure.

It may be of interest to reduce the volume of the suspended liquid material in the waste gases to be treated prior to their admission to the regenerative incinerator system, in order to reduce unwanted accumulation of mist or other compounds into the regenerator.

Figure 5:
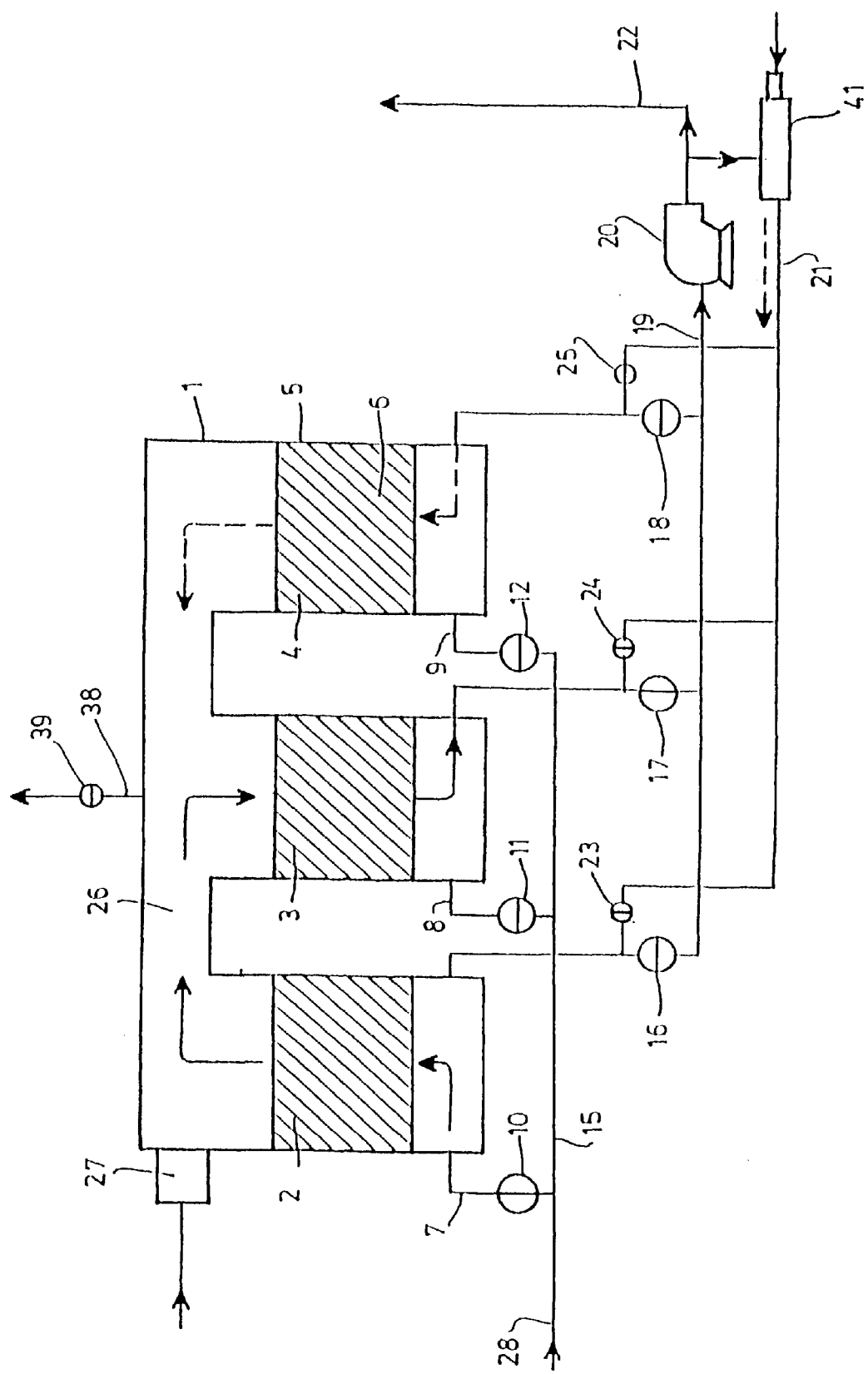
FIG. 5 is a flow diagram of a regenerative incineration as shown in FIG. 1, with no mist separation device but equipped with a vent stack illustrating the valve positions and flows during the periodic, extended purging cycle of one regenerator while the others are operated in a modified cycle of periods to treat the waste gases.

As shown in the drawings, except FIG. 5, this reduction can be achieved by installing a mist separation device 29 at a convenient point in the waste gas collecting conduit 28 upstream of the inlet conduit 15, in which a substantial fraction the liquid material in the form of a mist in the gas stream fed to the system is deposited on a filtration medium and removed as a liquid.

Numerous kinds of mist separation devices or eliminators are available in the industry and, may be used in accordance with the invention for the above mentioned purpose. Two major considerations that must however be kept in mind when selecting a suitable mist separation device for use in accordance with the invention, are the pressure loss that occurs when the gases passes through the device, and the occurrence of blockage which may result from deposit of tarry substances within the device. Although substantially all the suspended liquid material or mist could be removed in this way, the high pressure drop and cleaning requirements associated with the use of a high performance filter will generally be found to be impractical. Thus, removal of only a part of the suspended liquid material will often be preferred, leaving the remaining liquid contents to be dealt with by other methods described above. Removal of a substantial portion of the liquid phase is however quite beneficial to the operation of the regenerative incinerator system, as it results in a corresponding reduction in the flow and temperature of the purging gases required for satisfactory performance.

What is claimed is:

1. In a method for treating waste gases containing volatile toxic or odorous compounds in the form of a mist, using a regenerative incinerator system of the type comprising at least three regenerators, each of said regenerators containing a packing material, and having one end always in open communication with a combustion chamber common to all said regenerators and at another end, directing means to allow for a flow of gases in and out of said regenerators, said method having a cycle of operation comprising:

a) during a first period of time:
  directing said waste gases first through a first one of said regenerators so that said waste gases are heated by contact with the packing material contained in said first regenerator; then through said combustion chamber to oxidize said compounds contained in said waste gases; and finally through a second one of said regenerators to cool the gases from the combustion chamber by contact with the packing material contained in said second regenerator, such a contact causing said packing material to be heated, the gases leaving said second regenerator being clean and discharged to the atmosphere; and simultaneously recycling part of said clean gases as a purging gas through a third one of said regenerators for purging said third regenerator of any waste gases or of said compounds remaining therein, said purging gas being fed into an end of said third regenerator opposite to the one end thereof in communication with the combustion chamber so that the purging gas leaving said third regenerator is fed into the combustion chamber to remove any contaminant that would be carried by said purging gas before said purging gas is discharged from the system together with the clean gases;

b) during a second period of time:

directing the waste gases first through said second regenerator, then through the combustion chamber and finally through said third regenerator which was purged; and simultaneously recycling part of the clean gases leaving said third generator as a purging gas into said first regenerator; and c) during a third period of time:

directing said waste gases first through said third regenerator; then through the combustion chamber and finally through said first regenerator which was purged; and simultaneously recycling part of the clean gases leaving said first generator as a purging gas into said second regenerator; and d) repeating the previous steps in the same order to provide for a continuous flow and treatment of said waste gases through the system, together with a substantial recovery of the heat contained in said waste gases after combustion thereof in the combustion chamber, the improvement comprising:

e) raising the temperature of said part of said clean gases used as a purging gas prior to entry of said purging gas into each of said first, second and third regenerators to be purged so as to increase volatilization and removal of said compounds remaining in said regenerator after the passage of said waste gases.

2. The method of claim 1, further comprising:

injecting a fuel or combustion supporting gases into said combustion chamber and mixing said injected fuel or combustion supporting gases with the waste gases and combusting the mixture of the fuel or combustion supporting gases and waste gases so as to raise their temperature to about 1200° F. to 1800° F., in order to oxidize any contaminant contained in said waste gases.

3. The method of claim 2, further comprising:

pressurizing the clean gases prior to their discharge and prior to the recycling of part thereof as said purge gas.

4. The method of claim 3, wherein the temperature of the purging gas is raised over that of the clean gases leaving the system by means of a fuel burner that discharges into a purging gas supply conduit.

5. The method of claim 3, wherein the temperature of the said purging gas is raised by indirect heat exchange with a stream of purified gases which is at about 1200 to 1600° F.

6. The method of claim 5, wherein the temperature of said purging gas is controlled to about 300 to 800° F. by adjusting the flow rate of said stream of purified gases.

7. The method of claim 3, wherein the duration of each period of time in steps a), b) and c) is augmented so as to cause an increase in the temperature of the clean gases leaving the system and thus an increase in the temperature of the packing material contained in the first, second and third regenerators which, in turn, causes an increase in the volatilization and combustion of any compounds remaining in the regenerators after the passage of the waste gases.

8. The method of claim 3, comprising the additional step of:

f) removing any deposited residues remaining in any one of said first, second and third regenerator by passing said purging gas at a raised temperature for a period of time sufficient to cause the volatilization of said residues, said purging gas being subsequently oxidized in the combustion chamber and mixed with the clean gases formed by the operation of the other regenerators while said other regenerators continue to operate in a cycle modified to treat an uninterrupted flow of waste gases.

9. The method of claim 3, for use with a system comprising at least one additional regenerator, said method comprising the additional step of:

g) setting said cycle of operation so that one regenerator at a time is purged while the other regenerators are operated in accordance with said cycle of operation, thereby permitting the uninterrupted flow and treatment of the said waste gases.

10. The method of claim 3, comprising the additional step of:

h) discharging gases from said combustion chamber directly to the atmosphere by means of a control valve through a vent stack to prevent overheating of the regenerators.

11. The method of claim 10 comprising the additional step of:

i) cooling the regenerators by natural convection whenever the normal flow of waste gases through the system is accidentally interrupted by means of a control sequence which allows the flow of air or waste gases to be drawn through all the regenerators simultaneously and to be discharged from the combustion chamber to the atmosphere through said control valve and vent stack.

12. The method of claim 10, comprising the additional step of:

removing any residues remaining in any one regenerator by passing said purging gas for a period of time sufficient to raise the temperature of the packing material and cause the volatilization of said residues, said purging gas being subsequently discharged to the atmosphere through said control valve and vent stack, while the other regenerators are held inoperative awaiting this same cleaning step.

13. The method of claim 3, further comprising the additional step of:

k) reducing the contents of volatile compounds in the form of a mist or suspension of fine liquid droplets, in the waste gases prior to their introduction into one of said first, second and third regenerators by means of a mist separation device located in a conduit leading the said waste gases to a respective regenerator.

* * * * *